United States Patent
Venetianer et al.

(10) Patent No.: US 9,495,584 B1
(45) Date of Patent: Nov. 15, 2016

(54) SYSTEM AND METHOD FOR FACIAL RECOGNITION USING IMAGES CAPTURED FROM A TARGET ILLUMINATED WITH INFRARED LIGHT

(71) Applicant: Digital Signal Corporation, Chantilly, VA (US)

(72) Inventors: Péter L. Venetianer, McLean, VA (US); Miraj Shah, Fairfax, VA (US)

(73) Assignee: Digital Signal Corporation, Chantilly, VA (US)

( * ) Notice: Subject to any disclaimer, the term of this patent is extended or adjusted under 35 U.S.C. 154(b) by 0 days.

(21) Appl. No.: 14/732,655

(22) Filed: Jun. 5, 2015

(51) Int. Cl.
- *G06K 9/00* (2006.01)
- *H04N 5/33* (2006.01)
- *G06F 17/30* (2006.01)

(52) U.S. Cl.
CPC ..... *G06K 9/00288* (2013.01); *G06F 17/30256* (2013.01); *G06K 9/00228* (2013.01); *H04N 5/33* (2013.01)

(58) Field of Classification Search
CPC ............ G06K 9/00228; G06K 9/00221; G06K 9/00288; G06K 9/00281; G06K 9/00248; H04N 5/33; G06F 17/30256
USPC ....... 382/100, 118, 103, 115, 209, 162, 164, 382/167, 169, 243, 165, 154, 291, 190, 181, 382/276, 286; 345/419, 418, 441, 501, 473, 345/613, 589, 475, 619, 643, 536, 530, 581, 345/611, 660; 348/169
See application file for complete search history.

(56) References Cited

U.S. PATENT DOCUMENTS

| | | | | |
|---|---|---|---|---|
| 5,963,670 A * | 10/1999 | Lipson | ............... | G06F 17/3025 382/224 |
| 6,633,655 B1 * | 10/2003 | Hong | ................... | G02B 27/225 348/E13.022 |
| 6,807,300 B1 * | 10/2004 | Gindele | ..................... | G06T 5/20 382/167 |
| 7,177,450 B2 * | 2/2007 | Tajima | ............... | G06K 9/00288 340/5.83 |
| 7,366,350 B2 * | 4/2008 | Kajihara | .............. | G06K 9/4652 358/518 |
| 8,471,933 B2 * | 6/2013 | Matsushita | .............. | H04N 1/58 348/242 |
| 8,798,391 B2 * | 8/2014 | Tallamraju | ......... | G06K 9/00234 382/268 |
| 2014/0307058 A1 * | 10/2014 | Kirk | ........................ | H04N 5/33 348/47 |

* cited by examiner

*Primary Examiner* — Sheela C Chawan
(74) *Attorney, Agent, or Firm* — Toering Patents PLLC

(57) ABSTRACT

Various implementations of the invention perform facial recognition on a target image compared against a color image from an image gallery, where the target image was acquired by an infrared-sensitive camera of a target that was illuminated with infrared light. According to various implementations of the invention, a blue component and a green component of the pixels in the color image are suppressed or eliminated, and facial recognition is performed between the target image and the color-suppressed image.

15 Claims, 2 Drawing Sheets ously to illuminate the target in order to capture a better image of the target. In some circumstances, an infrared light source is used to illuminate the target for capture by a camera sensitive to infrared light. This type of illumination avoids certain problems with blinding or scaring the target or alerting the target to the camera's presence in certain low-light environments, including, for example, at night or when the target is driving, or otherwise inside, a vehicle.

SYSTEM AND METHOD FOR FACIAL RECOGNITION USING IMAGES CAPTURED FROM A TARGET ILLUMINATED WITH INFRARED LIGHT

FIELD OF THE INVENTION

The invention is generally related to facial recognition techniques and more particularly, to improving facial recognition of a target image compared against a gallery of color images, when the target image was captured from a target that was illuminated with infrared light.

BACKGROUND OF THE INVENTION

Conventional facial recognition techniques attempt to match a target image captured from a target against a repository of images (some of which may be color images) of known subjects. In some low-light environments, it may be necessary to illuminate the target in order to capture a better image of the target. In some circumstances, an infrared light source is used to illuminate the target for capture by a camera sensitive to infrared light. This type of illumination avoids certain problems with blinding or scaring the target or alerting the target to the camera's presence in certain low-light environments, including, for example, at night or when the target is driving, or otherwise inside, a vehicle.

However, conventional facial recognition techniques do not perform well with target images captured using infrared illumination when these target images are compared against a gallery of color images.

What is needed is an improved system and method for facial recognition of a target image compared against a gallery of color images, when the target image was captured from a target illuminated with infrared light.

SUMMARY OF THE INVENTION

Various implementations of the invention relate to improved facial recognition techniques on target images compared against a gallery of color images, when the target images were captured by an infrared-sensitive camera from a target illuminated with infrared light. According to various implementations of the invention, a blue component and a green component of the pixels in the color image are suppressed or eliminated, and facial recognition is performed between the target image and the color-suppressed image. According to various implementations of the invention, only a red component of the pixels in the color image are used, and facial recognition is performed between the target image and a red channel image. In some implementations of the invention, a subject in the color image may be a known or otherwise identified person.

These implementations, their features and other aspects of the invention are described in further detail below.

DETAILED DESCRIPTION

Detecting and subsequently recognizing a face of a target, via a machine, in an uncontrolled environment is challenging, especially in an uncontrolled outdoor environment. First, the target is free to move into, out of, and within a field of view of the camera, at a variety of ranges and any number of other motion factors as would be appreciated. Second, illumination of the target differs by weather, time of day, orientation of the target, objects in the environment, and any number of other illumination factors as would be appreciated. Third, having the target inside a vehicle dramatically increases the challenges by introducing vehicle type, vehicle motion, location of the target in the vehicle, window tinting, reflections, sunroofs, interior lighting, and any number of other vehicle factors as would be appreciated. Other factors provide further challenges to detecting and recognizing faces in the uncontrolled environment.

One mechanism to improve illumination in certain of these environments (e.g., at night, in a vehicle, etc.) is to use a camera sensitive to infrared light in combination with an infrared illumination source. Infrared light is typically not perceptible to the target and yet, target images captured with the infrared-sensitive camera, often are improved over target images of poorly-lit targets captured by cameras mainly sensitive to visible spectrums. However, as discussed above, conventional facial recognition techniques do not perform well with target images captured by an infrared-sensitive camera when the target is illuminated by the infrared illumination source, especially when such target images are compared against a gallery of known or reference color images.

Figure 1:
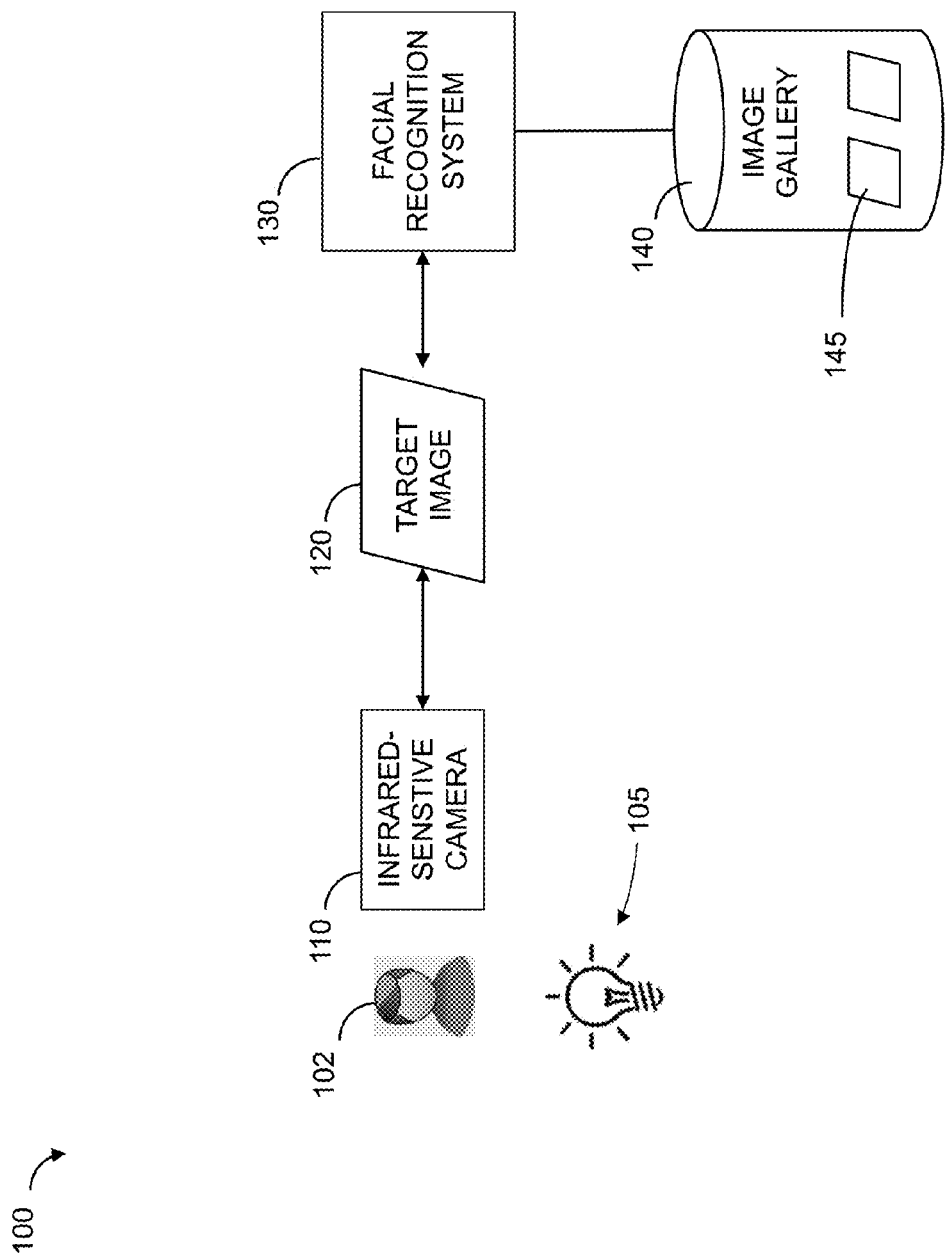
FIG. 1 illustrates an image processing system according to various implementations of the invention.

FIG. 1 illustrates an image processing system 100 according to various implementations of the invention. Image processing system 100 includes an infrared-sensitive camera 110 and a facial recognition system 130. In some implementations of the invention, infrared-sensitive camera 110 includes a video camera. In some implementations of the invention, infrared-sensitive camera 110 includes a digital camera. In some implementations of the invention, infrared-sensitive camera 110 includes a digital video camera. In some implementations of the invention, infrared-sensitive camera 110 includes a camera with a combination of film, sensor(s), and/or filter(s) that make it mainly responsive to infrared light (a so-called "infrared camera"). In some implementations of the invention, infrared-sensitive camera 110 includes a camera having a spectral bandwidth that includes the infrared wavelengths as well as other wavelengths (e.g., visible wavelengths, etc.). In some implementations of the invention, infrared-sensitive camera 110 includes a camera having a spectral bandwidth that includes the infrared wavelengths as well as other wavelengths (e.g., visible wavelengths, etc.) and a filter that filters out such other wavelengths.

In some implementations of the invention, infrared-sensitive camera 110 may be used with an infrared light source such as the sun (not otherwise illustrated). As would be appreciated, the sun provides light in the infrared spectrum that may illuminate the target. In such implementations of the invention, infra-sensitive camera 110 may employ a filter to attenuate light in the visible spectrum as would be appreciated.

In some implementations of the invention, infrared-sensitive camera 110 may be used with an infrared light source 105. As would be appreciated, infrared light source 105 provides an artificial source of light in the infrared spectrum as compared with a natural source such as the sun. In some implementations of the invention, infrared light source 105 may be built into infrared-sensitive camera 110 as would be appreciated. In some implementations of the invention, infrared light source 105 may be external to infrared-sensitive camera 110 as would be appreciated.

In some implementations of the invention, infrared light source 105 may be used to illuminate a target 102 during the night or other poorly lit environments. In some implementations of the invention, infrared light source 105 may be used to illuminate the target in a vehicle. In some implementations of the invention, infrared light source 105 may be used to illuminate the target during harsh sunlight to illuminate areas of the target otherwise cast in shadow. In some implementations of the invention, infrared light source 105 may be strobed to illuminate the target over a brief period. In some implementations of the invention, as above, infrared-sensitive camera 110 may employ a filter to attenuate light in the visible spectrum as would be appreciated.

Infrared-sensitive camera 110 captures and outputs one or more target images 120 (sometimes referred to as an image stream 120) of a target 102, or a face of target 102 as would be appreciated.

In some implementations of the invention, infrared-sensitive camera 110 includes a video camera that provides one or more acquired images 120 of the target that may be used in combination with a lidar system that provides a range measurement and/or a Doppler velocity measurement for each of a plurality of points on the target (or its face). Such a combined video camera and lidar system is available from Digital Signal Corporation, Chantilly, Va. and described in U.S. Pat. No. 8,717,545 to Sebastian et al., which is incorporated herein by reference in its entirety.

In some implementations of the invention, facial recognition system 130 may comprise various hardware, software, firmware and/or any combination thereof that may be configured to perform various functions, including the functions described herein, as would be appreciated. Once so configured, facial recognition system 130 becomes a particular machine configured to implement various features and aspects of the invention as would be appreciated. In some implementations of the invention, facial recognition system 130 includes a computing processor and a memory (not otherwise illustrated), where the memory is configured to store instructions that, when executed by the computing processor, implement and/or perform various features and aspects of the invention, again, as would be appreciated.

Facial recognition system 130 receives acquired (or captured) target images 120 and employs various facial recognition techniques in an attempt to match target images 120 against known images 145 in image database 140 (e.g., an image gallery or gallery of known images), at least some of which are known color images 145. Rather than attempt to match target image 120, which was captured by infrared-sensitive camera 110 while being illuminated with infrared light, directly against known color images 145, various implementations of the invention compare target image 120 with a red component (also sometimes referred to as a red channel) of known color images 145 as described below.

Typical color images employ what is referred to as an RGB color model. The RGB color model is an additive color model in which three colors of light, namely: red, green, and blue, are added together in various ways to reproduce a broad array of colors. The name of the model comes from the initials of the three additive primary colors: red, green, and blue. The RGB color model is used to sense, represent and display images in electronic systems, such as televisions and computers, as well as cameras. Pixels in the RGB color model are encoded, in part, by an amount of each color to be used to render a pixel in an image or display. For example, pixels may be encoded using eight bits for each of the red, green, and blue components to describe an amount of the respective component to use to render the pixel as would be appreciated.

According to various implementations of the invention, the red component of the pixels in known color image 145 is primarily used for purposes of facial recognition of acquired image 120; the other components, namely the green component and the blue component in known color image 145, are suppressed. In some implementations of the invention, the green component and/or the blue component may be suppressed by some amount less than their original value. In some implementations of the invention, the green component and/or the blue component may be suppressed to a fractional amount (e.g., reduced to a third, to a half, to two-thirds, etc.). In some implementations of the invention, the green component and/or the blue component may be suppressed by a fractional amount (e.g., reduced by a third, by a half, by two-thirds, etc.). In some implementations of the invention, the green and/or blue component may be suppressed to less than some percentage of their original values (e.g., 5%, 10%, 20%, 30%, 40% 50%, etc.). In some implementations of the invention, the green component and/or the blue component may be suppressed to an insubstantial amount (e.g., less than 10% of the original values, etc.) or entirely eliminated for purposes of facial recognition. In some implementations of the invention, the green component and/or the blue component may be suppressed by ignoring the green component and/or the blue component, and processing known color image 145 based on the red component. In some implementations of the invention, the green component and/or the blue component may be suppressed by increasing the red component by some amount. Various other mechanisms for enhancing the red component of known color image 145 and/or suppressing the green and/or blue component(s) of known color image 145 may be used as would be apparent. According to various implementations of the invention, the red component of the pixels in known color image 145 is used for purposes of recognizing target image 120 and one or both of the other components are suppressed.

According to various implementations of the invention, facial recognition system 130 performs various conventional facial recognition techniques on target image 120 and a known color image 145 having its green and/or blue components suppressed (i.e., a so-called "color-suppressed known image"). Various implementations of the invention dramatically improve performance of facial recognition techniques when the color-suppressed known image is compared against target image 120 that was illuminated by infrared light and captured by infrared-sensitive camera 110. Various implementations of the invention dramatically improve performance of facial recognition techniques when only the red component of known color image 145 (i.e., a so-called "red channel image") is compared against target image 120 that was illuminated by infrared light and captured by infrared-sensitive camera 110.

Figure 2:
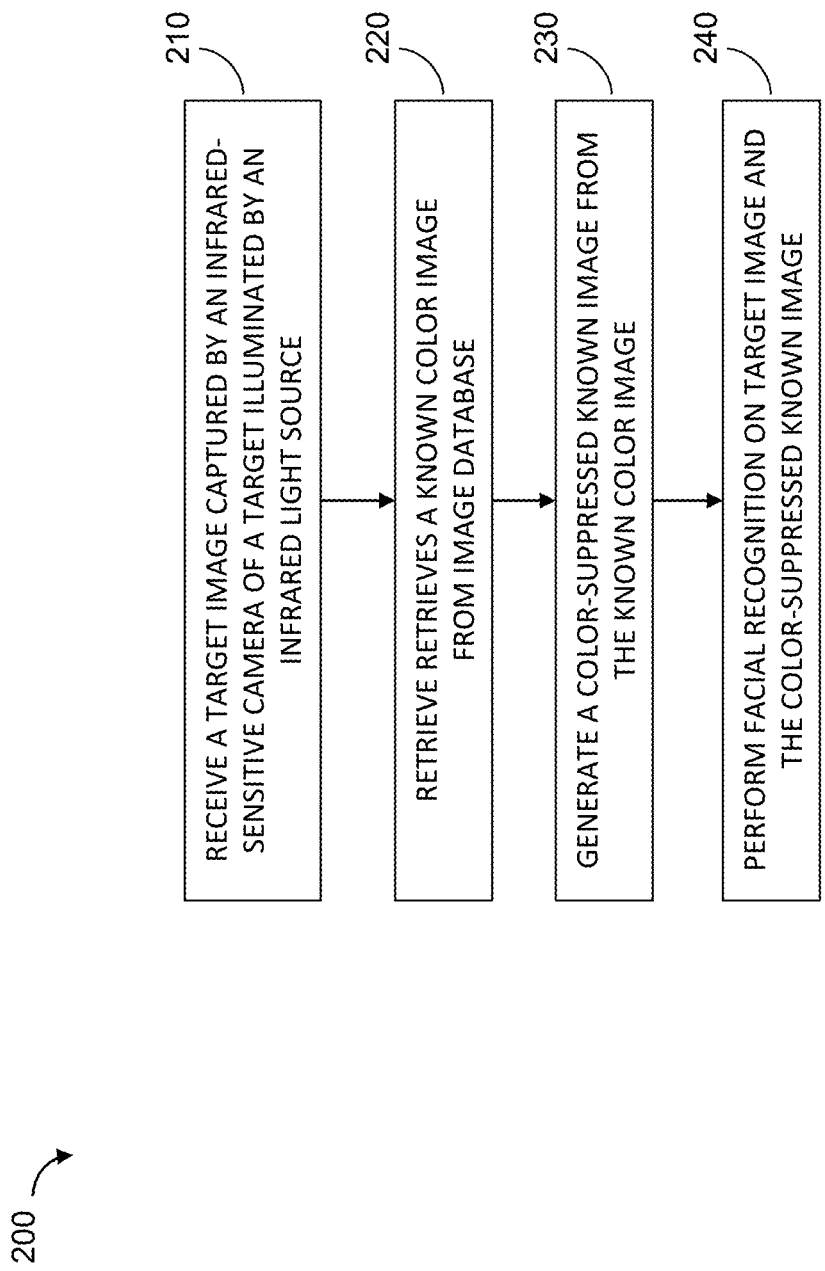
FIG. 2 illustrates an operation of image processing system according to various implementations of the invention.

FIG. 2 illustrates an operation of facial recognition system 130 in further detail. In an operation 210, facial recognition system 130 receives target image 120. As described above, target image 120 is an image captured by an infrared-sensitive camera 110 of a target that was illuminated by an infrared light source. In an operation 220, facial recognition system 130 retrieves a known color image 145 from image database 140. As described above, known color image 145 is a color image of a known or identified subject.

In an operation 230, facial recognition system 130 generates a color-suppressed known image. In some implementations of the invention, facial recognition system 130 suppresses the blue component and/or the green component of known color image 145 to generate the color-suppressed known image. In some implementations of the invention, color-suppressed known image comprises substantially only the red component of known color image 145.

In an operation 240, facial recognition system 130 performs facial recognition on target image 120 and the color-suppressed known image.

While the invention has been described in terms of an RGB color model, the invention is not so limited. For example, the invention may be employed with other color models and used, in effect, to suppress shorter wavelengths of visible light in known color image 145 in relation to longer wavelengths of visible light in known color image 145.

While the invention has been described herein as comparing target image 120 against "known images" 145, the invention is not so limited. Various implementations of the invention apply to comparison of target image 120 against any other color image, for purposes of, for example, establishing that the person in target image 120 matches the person in the color image, regardless of whether the person is known or otherwise identified.

While the invention has been described herein in terms of various implementations, it is not so limited and is limited only by the scope of the following claims, as would be apparent to one skilled in the art. These and other implementations of the invention will become apparent upon consideration of the disclosure provided above and the accompanying figures. In addition, various components and features described with respect to one implementation of the invention may be used in other implementations as well.

What is claimed is:

1. A method for performing facial recognition, the method comprising:
   receiving a target image from a camera sensitive to infrared light, the target image captured from a target that was illuminated by an infrared light source;
   receiving a color image, the color image comprising a color image of a subject;
   suppressing a blue component or a green component of a plurality of pixels in the color image to produce a color-suppressed image; and
   performing facial recognition on the target image and the color-suppressed image.

2. The method of claim 1, wherein suppressing a blue component or a green component of a plurality of pixels in the color image comprises suppressing the blue component or the green component of the plurality of pixels in the color image to zero to produce the color-suppressed image.

3. The method of claim 2, wherein suppressing the blue component or the green component of the plurality of pixels in the color image to zero to produce the color-suppressed image comprises suppressing the blue component and the green component of the plurality of pixels in the color image to zero to produce the color-suppressed image.

4. The method of claim 1, wherein suppressing a blue component or a green component of a plurality of pixels in the color image comprises suppressing the blue component or the green component of the plurality of pixels in the color image to less than ten percent of their original value to produce the color-suppressed image.

5. The method of claim 4, wherein suppressing the blue component or the green component of the plurality of pixels in the color image to less than ten percent of their original value to produce the color-suppressed image comprises suppressing the blue component and the green component of the plurality of pixels in the color image to less than ten percent of their original value to produce the color-suppressed image.

6. The method of claim 1, wherein suppressing a blue component or a green component of a plurality of pixels in the color image comprises ignoring the blue component or the green component of the plurality of pixels in the color image to produce the color-suppressed image.

7. The method of claim 6, wherein ignoring the blue component or the green component of the plurality of pixels in the color image to produce the color-suppressed image comprises ignoring the blue component and the green component of the plurality of pixels in the color image to produce the color-suppressed image.

8. The method of claim 1, wherein receiving a target image from a camera sensitive to infrared light comprises receiving the target image from an infrared camera.

9. The method of claim 1, wherein the infrared light source was an artificial infrared light source.

10. The method of claim 1, wherein the infrared light source was the sun.

11. The method of claim 1, wherein receiving a color image comprises receiving of a color image of a known subject.

12. A method for performing facial recognition, the method comprising:
   receiving a target image from a camera sensitive to infrared light, the target image captured from a target that was illuminated by an infrared light source;
   receiving a color image, the color image comprising a color image of a subject, the color image comprising a plurality of pixels;
   generating a red channel image of the color image, the red channel image consisting substantially of a red component of each of the plurality of pixels in the color image; and
   performing facial recognition on the target image and the red channel image.

13. The method of claim 12, wherein the color image of a subject comprises a color image of a known subject.

14. A method for performing facial recognition, the method comprising:
   receiving a target image from a camera sensitive to infrared light, the target image captured from a target that was illuminated by an infrared light source;
   receiving a color image, the color image comprising a color image of a subject, the color image comprising a plurality of pixels;
   suppressing colors of higher wavelengths in the color image to produce a color-suppressed image; and
   performing facial recognition on the target image and the color-suppressed image.

15. The method of claim 14, wherein the infrared light source is an artificial light source.

* * * * *